US011085558B2

(12) United States Patent
Clark et al.

(10) Patent No.: US 11,085,558 B2
(45) Date of Patent: *Aug. 10, 2021

(54) HOSE WITH RUBBER AND PLASTIC

(71) Applicant: Eaton Intelligent Power Limited, Dublin (IE)

(72) Inventors: Aaron David Clark, Lambertville, MI (US); Gina Theresa Clark, Lambertville, MI (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 181 days.

This patent is subject to a terminal disclaimer.

(21) Appl. No.: 15/806,129

(22) Filed: Nov. 7, 2017

(65) Prior Publication Data

US 2018/0080584 A1    Mar. 22, 2018

Related U.S. Application Data

(63) Continuation of application No. 14/483,813, filed on Sep. 11, 2014, now Pat. No. 9,841,125.

(Continued)

(51) Int. Cl.
| | |
|---|---|
| *B32B 1/08* | (2006.01) |
| *F16L 11/04* | (2006.01) |
| *F16L 11/08* | (2006.01) |
| *B05D 7/00* | (2006.01) |
| *B32B 1/02* | (2006.01) |
| *B29C 48/09* | (2019.01) |
| *B29C 48/21* | (2019.01) |
| *B29C 48/00* | (2019.01) |

(Continued)

(52) U.S. Cl.
CPC .............. *F16L 11/045* (2013.01); *B05D 7/50* (2013.01); *F16L 11/085* (2013.01); *B05D 2254/02* (2013.01); *B05D 2505/00* (2013.01); *B05D 2507/005* (2013.01); *B29C 48/022* (2019.02); *B29C 48/09* (2019.02); *B29C 48/153* (2019.02); *B29C 48/21* (2019.02); *B29K 2077/00* (2013.01); *B29K 2105/0827* (2013.01)

(58) Field of Classification Search
CPC ....... B32B 1/02; B32B 1/08; Y10T 428/1352; Y10T 428/139; Y10T 428/1393; F16L 11/045; F16L 11/085
USPC ............................................. 428/36.9, 36.91
See application file for complete search history.

(56) References Cited

U.S. PATENT DOCUMENTS

| 4,559,688 A | 12/1985 | Abu-Isa et al. |
| 4,842,024 A | 6/1989 | Palinchak |

(Continued)

FOREIGN PATENT DOCUMENTS

| WO | 2004/063279 | 7/2004 |
| WO | 2011/152991 | 12/2011 |

OTHER PUBLICATIONS

International Search Report and Written Opinion for Application No. PCT/US2014/055605 dated Dec. 23, 2014.

(Continued)

*Primary Examiner* — Marc A Patterson
(74) *Attorney, Agent, or Firm* — Merchant & Gould, P.C.

(57) ABSTRACT

A hose is provided comprising a rubber backing layer directly bonded to a continuous polyamide layer without an intervening adhesive layer, wherein the hose exhibits increased low and high temperature capability and decreased permeation compared to standard automotive refrigerant hoses.

30 Claims, 9 Drawing Sheets

Related U.S. Application Data

(60) Provisional application No. 61/878,238, filed on Sep. 16, 2013.

(51) Int. Cl.
*B29C 48/153* (2019.01)
*B29K 105/08* (2006.01)
*B29K 77/00* (2006.01)

(56) References Cited

U.S. PATENT DOCUMENTS

| | | | |
|---|---|---|---|
| 4,905,735 A | 3/1990 | Kkiyoshi | |
| 5,132,182 A | 7/1992 | Grosse-Puppendahl et al. | |
| 5,843,577 A | 12/1998 | Ouhadi et al. | |
| 5,962,146 A | 10/1999 | Betremieux et al. | |
| 6,166,143 A | 12/2000 | Watanabe et al. | |
| 6,294,600 B1 | 9/2001 | Takada et al. | |
| 6,300,418 B1 | 10/2001 | Brzoskowski et al. | |
| 6,581,643 B2 | 6/2003 | Guippe et al. | |
| 6,652,937 B1 | 11/2003 | Guo et al. | |
| 7,291,677 B2 * | 11/2007 | Cai | C08L 23/10 525/191 |
| 8,071,220 B2 | 12/2011 | Abraham et al. | |
| 8,298,617 B2 * | 10/2012 | Bouwmeester | C08K 3/06 427/372.2 |
| 9,841,125 B2 * | 12/2017 | Clark | F16L 11/045 |
| 9,976,021 B2 * | 5/2018 | Li | C08L 23/16 |
| 2004/0071913 A1 | 4/2004 | Bellet | |
| 2004/0118469 A1 | 6/2004 | Wilson et al. | |
| 2005/0059764 A1 | 3/2005 | Beck | |
| 2006/0263556 A1 | 11/2006 | Beck | |
| 2009/0017247 A1 | 1/2009 | Bellet et al. | |
| 2009/0068386 A1 | 3/2009 | Emad et al. | |
| 2012/0145275 A1 | 6/2012 | Seebold et al. | |
| 2013/0030109 A1 | 1/2013 | Pawlik et al. | |
| 2013/0078472 A1 | 3/2013 | Higashika et al. | |

OTHER PUBLICATIONS

Supplementary European Search Report dated Apr. 4, 2017 in EP Application No. 14844086.0, 6 pages total.

* cited by examiner

HOSE WITH RUBBER AND PLASTIC

CROSS-REFERENCE TO RELATED APPLICATIONS

This is a continuation application of U.S. application Ser. No. 14/483,813, filed Sep. 11, 2014, issued as U.S. Pat. No. 9,841,125 on Dec. 12, 2017, which claims the benefit of U.S. Provisional Patent Application Ser. No. 61/878,238, filed Sep. 16, 2013, each of which is hereby incorporated by reference in its entirety.

BACKGROUND

Hoses have uses in many industries, such as automotive, appliance, aerospace, and manufacturing industries. Many hoses experience high and low temperatures and some come in contact with corrosive materials. Ideally, a hose is not significantly affected by changes in temperature, exposure to environmental moisture or by the type of fluid passing through the hose. Additionally, a hose loses utility if it becomes permeable to outside elements (ingression) or to fluid passing through the hose (effusion). Existing automotive hoses can exhibit undesirable permeation relative to new refrigerants. A hose with increased low and high temperature capability and decreased permeation compared to current automotive refrigerant hoses is desirable.

SUMMARY

Adhesive used to bond a plastic layer to a rubber layer in standard refrigerant hoses can result in spotty adhesion. In order to solve this problem, methods and compositions have been developed to provide direct bonding of an EPDM rubber backing layer to a plastic veneer of a refrigerant hose, without an intervening adhesive layer. In some embodiments, hoses are provided that exhibit increased low and high temperature capabilities and decreased permeation compared to standard refrigerant hoses.

A hose is provided comprising at least two layers including a rubber backing layer directly bonded to a polyamide (PA) layer. The rubber backing layer is prepared from a rubber backing composition comprising an ethylene propylene diene monomer (EPDM), a phenylenedimaleimide, and a maleated compound. In some embodiments, the hose comprises a multiplicity of layers. In some embodiments, the polyamide layer is a continuous layer. In some embodiments, the maleated compound is a maleated polybutadiene. In some embodiments, the maleated compound is present in the rubber backing composition in a range from about 0.1 wt % to about 15 wt %; 0.5 wt %-10 wt %; or 3 wt %-7 wt % compared to the total weight of filled rubber backing composition. In some embodiments, a phenylenedimaleimide is present in the rubber backing composition at from about 0.1 wt %-5 wt %; 0.5 wt %-3 wt %; or 1.00 wt %-1.75 wt % of the total weight of the filled rubber backing composition.

In some embodiments, the rubber backing composition further comprises an antioxidant. In some embodiments, the rubber backing composition does not contain polypropylene.

In some embodiments, the rubber backing layer is prepared from a rubber backing composition further comprising one or more fillers. In some embodiments, the rubber backing composition comprises one or more fillers selected from carbon black, silica, silicates, talc, aluminum silicate, calcium carbonate, zinc oxide, titanium dioxide and stearic acid. In some embodiments, the rubber backing composition comprises filler in an amount from about 30-60 wt %, 40-60 wt %, or 45-60 wt % compared to the total weight of the rubber backing composition. In some embodiments, the ethylene propylene diene monomer (EPDM) is low ethylene EPDM. In some embodiments, the low ethylene EPDM has no more than 60% ethylene.

In some embodiments, a hose is provided comprising a rubber backing layer and a polyamide layer wherein the rubber backing layer is directly covalently bonded directly to the polyamide layer without adhesive. In some embodiments, the rubber backing composition does not contain a polyamide. In some embodiments, the rubber backing composition comprises an organic peroxide.

In some embodiments, a hose is provided comprising a rubber backing layer and a polyamide layer, wherein the rubber backing layer is prepared from a rubber backing composition comprising an organic peroxide that is selected from dicumyl peroxide and t-butyl cumyl peroxide. In some embodiments, the rubber backing composition does not contain polyvinyl butyral.

In some embodiments, a hose is provided comprising a rubber backing layer and a polyamide layer, wherein the polyamide layer is prepared from a second polyamide composition comprising one or more of polyamide 6,6; polyamide 6; polyamide 11; or polyamide 12. In some embodiments, the polyamide layer is prepared from a polyamide composition comprising polyamide 6,6. In some embodiments, the polyamide composition does not contain EPDM. In some embodiments, the polyamide layer is a continuous layer.

In some embodiments, the rubber backing layer as provided herein, exhibits adhesion to a polyamide layer of greater than 10 lbf/in, when tested according to ASTM D413 as provided herein.

In some embodiments, a hose is provided comprising a rubber backing layer directly bonded to a polyamide layer, wherein the hose comprises at least five layers arranged in the hose's radial direction from the outside inwards in the following order: a cover layer; a reinforcement layer; the rubber backing layer; the polyamide layer; and a resistance layer. In some embodiments, the hose comprises a multiplicity of layers wherein a continuous polyamide plastic layer is bonded directly to a rubber backing layer without an intervening adhesive layer.

The hose provided herein comprising a continuous polyamide plastic layer bonded directly to a rubber backing layer without an intervening adhesive layer exhibits surprisingly improved properties including one or more of improved adhesion between a rubber backing layer and a polyamide layer without employing an intervening adhesive layer, increased high and low temperature stability, decreased effusion, decreased permeation, and/or decreased moisture ingression, when compared to standard automotive refrigerant hose GH134.

In some embodiments, the hose provided herein exhibits decreased effusion or permeation to a refrigerant, relative to a commercially available automotive hose when tested in accordance with SAE J2064. In some embodiments, the hose provided herein, when tested according to SAE J2064 at 80° C.±2° C., exhibits a permeation value of less than 3 kg/m2/yr for refrigerant R-134a (1,1,1,2-tetrafluoroethane).

In some embodiments, the hose provided herein, when tested according to SAE J2064 at 80° C.±2° C., exhibits a permeation value of less than 3 kg/m2/yr, or preferably less than 2 kg/m2/yr, for refrigerant R-1234-yf (2,3,3,3-tetrafluoropropene).

In some embodiments, the improved properties of the hose provided herein are imparted due to an improved rubber backing layer that is prepared from a rubber backing composition comprising an ethylene propylene diene monomer (EPDM), a phenylenedimaleimide, and a maleated compound. In some embodiments, the rubber backing composition surprisingly allows for a higher filler load of up to 50 wt %, 55 wt %, or preferably up to 60 wt % of total weight of the rubber backing composition while retaining improved properties relative to a standard R134 multi-refrigerant hose.

In some embodiments, a method is provided for bonding two layers of a hose comprising blending a first composition comprising ethylene propylene diene monomer (EPDM), a maleated compound and phenylenedimalemide; and bonding said composition to a polyamide layer.

In some embodiments, a method is provided for directly bonding together two layers of a hose, the method comprising blending a rubber backing composition comprising ethylene propylene diene monomer (EPDM), a maleated compound and a phenylenedimalemide; and bonding said composition to a polyamide layer. In some embodiments, the blending is accomplished using a Banbury mixer. In some embodiments, the rubber backing layer is applied to the polyamide layer by press curing or extrusion. In some embodiments, the extrusion comprises shearing and is followed by vulcanizing of the green rubber backing layer. In some embodiments, the vulcanizing is performed at 300° F.-330° F.

In some embodiments, a method is provided for directly bonding two layers of a hose, the method comprising blending a rubber backing composition comprising ethylene propylene diene monomer (EPDM), a maleated compound and a phenylenedimalemide; and bonding said composition to a polyamide layer, wherein the polyamide layer is prepared from a polyamide composition comprising polyamide 6, 6. In some embodiments, the polyamide (PA) layer is a continuous layer. In some embodiments, the polyamide (PA) layer is an inner layer, and the rubber backing layer is an outer layer. In some embodiments, the hose construction could be a barrier design where the PA layer is disposed between the rubber backing layer and the cover layer.

In some embodiments, a method of making a hose is provided, the method comprising co extruding two or more polyamide layers onto a mandrel to form a veneer comprising an inner resistance layer and a polyamide layer; blending a first composition comprising an ethylene propylene diene monomer (EPDM), maleic anhydride and phenylenedimalemide and extruding the first composition on top of the polyamide layer to form a rubber backing layer; applying a reinforcement layer over the rubber backing layer; extruding a cover layer over the reinforcement layer to form a green hose; vulcanizing the green hose; and expelling the hose from the mandrel. In some embodiments the extrusion comprises shearing and heating. In some embodiments, the vulcanizing occurs at 300-330° F. In some embodiments, the veneer is prepared by coextruding PA6 and PA6,6 on the mandrel.

In some embodiments, a rubber backing composition is provided comprising one or more ethylene propylene diene monomers (EPDMs), a phenylenedimaleimide, and a maleated compound. In some embodiments, the rubber backing composition comprises one or more EPDMs in a range from about 20 wt % to about 60 wt %; about 25 wt % to about 55 wt %; about 30% to about 45 wt %; 30 wt % to about 40 wt %; 30 wt % to about 35 wt %; or 1.00 wt % to about 36 wt % compared to the total weight of the filled rubber backing composition.

In some embodiments, the ethylene propylene diene monomer (EPDM) is low ethylene EPDM. In some embodiments, the low ethylene EPDM has no more than 60% ethylene. In some embodiments, the maleated compound is present in the rubber backing composition in a range from about 0.1 wt % to about 15 wt %; 0.5 wt %-10 wt %; or 3 wt %-7 wt % compared to the total weight of filled rubber backing composition. In some embodiments, a phenylenedimaleimide is present in the rubber backing composition at from about 0.1 wt %-5 wt %; 0.5 wt %-3 wt %; or 1.00 wt %-1.75 wt % of the total weight of the filled rubber backing composition.

In some embodiments, the rubber backing composition comprises one or more organic peroxides. In some embodiments, the composition comprises an organic peroxide selected from dicumyl peroxide and t-butyl cumyl peroxide. In some embodiments, the rubber backing composition further comprises one or more fillers. In some embodiments, the rubber backing composition further comprises one or more plasticizers. In some embodiments, the rubber backing composition comprises one or more fillers selected from carbon black, silica, silicates, talc, aluminum silicate, calcium carbonate, zinc oxide, titanium dioxide and stearic acid. In some embodiments, the rubber backing composition comprises filler in an amount from about 30-60 wt %, 40-60 wt %, or 45-60 wt % compared to the total weight of the rubber backing composition. In some embodiments, the rubber backing composition does not contain polyvinyl butyral. In some embodiments, the rubber backing composition does not contain a polyamide.

DETAILED DESCRIPTION

As used herein, the terms "a" or "an" are defined as singular or plural.

As used herein, the term "about" means within ten percent (10%) of the given value, either ten percent more than the given amount or ten percent less than the given amount, or both.

As used herein, the term "composition" refers to one or more of a compound, mixture, blend, alloy, polymer and/or copolymer.

As provide herein, ranges are intended to include, at least, the numbers defining the bounds of the range.

Figure 1:
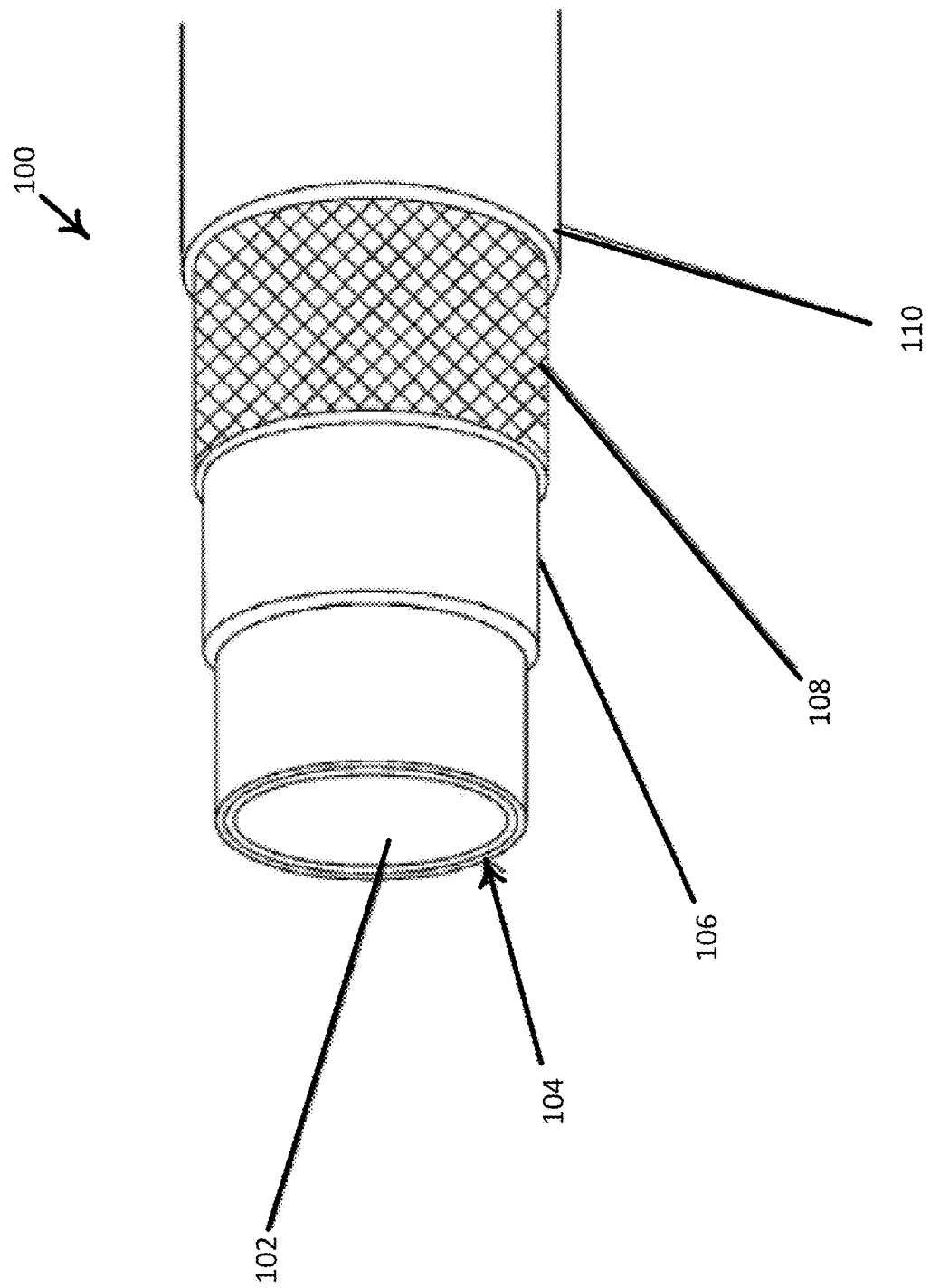
FIG. 1 illustrates one embodiment of a hose with a multiplicity of layers including a rubber backing layer bonded directly to a continuous polyamide layer.

FIG. 1 is an illustration of one embodiment of the present invention, where the embodiment includes a hose 100 with a multiplicity of layers. In this example, the layers include a cover layer 110, a reinforcement layer 108, a rubber backing layer 106, a polyamide layer 104 and a resistance layer 102.

The rubber backing layer 106 is prepared from a rubber backing composition comprising ethylene propylene diene monomer (EPDM), N,N'-m-phenylenedimaleimide (HVA-2), and a maleated compound. The rubber backing composition allows for direct bonding to polyamide without an intervening adhesive layer upon vulcanization. In some embodiments, the rubber backing layer 106 is prepared from a composition comprising EPDM, HVA-2, a maleated compound and one or more each of fillers, plasticizers, vulcanizing agents, peroxides, and/or antioxidants. In some embodiments, the rubber backing layer 106 is prepared from a composition that does not contain polyvinyl butyral (PVB). In some embodiments, the rubber backing layer is prepared from a composition that does not contain polypropylene. In some embodiments, the rubber backing layer 106 is prepared from a composition that does not contain a polyamide.

EPDM rubbers are produced by polymerization of a mixture of ethylene and propylene and optionally a diene in the presence of a Ziegler-Natta catalyst, such as, for example, diethylaluminum chloride. Compression set (C Set) is one of the primary characteristics of a rubber compound directing low temperature sealing capability. EPDM ethylene content is an important factor influencing this compression effect. As the ethylene content increases, a low-level of crystallinity develops above about 55%-65%. If the ethylene/propylene ratio is about equal and the distribution of both monomers in the polymer chain is random then the EPDM is amorphous. Polymers with ethylene content above 60% tend to show high compression set, while the amorphous (less than 60% ethylene) materials provide decreased set values at low temperatures.

In some embodiments, the rubber backing layer 106 is prepared from a rubber backing layer composition comprising one or more low ethylene content EPDMs. In some embodiments, the EPDM is a low ethylene EPDM having less than about 60% ethylene content. In some embodiments, the low ethylene EPDM is selected from an EPDM having an ethylene content in a range of from about 45 wt % to about 60 wt % ethylene; about 50 wt % to about 60 wt % ethylene; or about 55 wt % to about 60 wt % ethylene content.

In some embodiments, the rubber backing layer composition comprises one or more suitable commercially available EPDM products, such as, for example Vistalon™ 2504 (an ethylene propylene diene terpolymer rubber having about 57.5 wt % ethylene content by ASTM D3900A, ExxonMobil Chemical); Vistalon™ 2502 (an ethylene propylene diene terpolymer rubber having about 57.5 wt % ethylene content by ASTM D3900A, ExxonMobil Chemical); Nordel™ IP 3670 (a slightly crystalline, ethylene-propylene-diene terpolymer, that contains about 56.7-59.7% by mass ethylene by ASTM D3900, Dow Chemical Company); Nordel™ IP 5565 (an amorphous EPDM that contains about 50% by mass ethylene by ASTM D3900, Dow Chemical Company); Nordel™ IP 4520 (an amorphous, high diene, EPDM that contains about 50% by mass ethylene by ASTM D3900, Dow Chemical Company); Buna® EP G 6850 (an ethylene-propylene-diene rubber (EPDM), amorphous; with ethylidene norbornene as termonomer and about 51% by mass ethylene according to ASTM D 3900, Lanxess Corporation); or Royalene® 563 (an ethylene-propylene ethylidene norbornene rubber that contains about 57.3% ethylene, Lion Copolymer Geismar, LLC).

In some embodiments, the rubber backing layer 106 is prepared from a rubber backing composition comprising one or more EPDMs in a range from about 20 wt % to about 60 wt %; about 25 wt % to about 55 wt %; about 30% to about 45 wt %; 30 wt % to about 40 wt %; 30 wt % to about 35 wt %; or about 34 wt % to about 36 wt % compared to the total weight of the filled rubber backing composition.

In other embodiments, the EPDM is present in the rubber backing composition at about 40 wt % to about 70 wt %; about 45 wt % to about 65 wt %; or about 50 wt % to about 60 wt % compared to the total weight of the filled rubber backing composition to allow for injection molding. This embodiment can allow for lower use of carbon black filler.

In some embodiments, the rubber backing layer 106 is prepared from a rubber backing composition comprising from about 0.01 wt % to about 10 wt % of a phenylenedimalemide; from about 0.1 wt % to about 5 wt %; from about 6 wt % to about 9 wt %; or from about 0.5 wt % to about 3 wt % of a phenylenedimalemide. In some embodiments, the phenylenedimaleimide is N,N'-m-phenylenedimaleimide (CAS RN: 3006-93-7; N,N'-1,3-phenylene bismaleimide; HVA-2 curative, DuPont Chemical Co.). In another aspect of an embodiment, the HVA-2 is present in the composition used to prepare the rubber backing layer at from about 0.1 wt % to about 3 wt %; from 1% to about 2% by weight; from about 1.01 wt % to about 1.5 wt % compared to the total weight of the filled rubber backing composition.

The term "maleated compound" as used herein refers to a compound having one or more, or two or more, maleic anhydride substituents. In some embodiments, the maleated compound is a maleated polybutadiene. The maleated polybutadiene can be selected from a commercially available product, such as Ricobond™, for example, Ricobond® 1756 HS (Polybutadiene adducted with maleic anhydride, Cray Valley USA), or POLYVEST® MA 75 (a maleic anhydride adduct of a low molecular weight 1,4-cis polybutadiene which has succinic anhydride groups randomly distributed along the polymer chains, Evonik Corporation). In some embodiments, the maleated compound is present in the composition used to prepare the rubber backing layer 106 at from about 0.1 wt % to about 10 wt %; from about 0.5 wt % to about 5 wt %; from about 7 wt % to about 9 wt %; or from about 2 wt % to about 5 wt % compared to the total weight of the filled rubber backing composition. The maleated compound is present in the composition in order to achieve maximum level of bonding. In other aspects of an embodiment, the maleated compound is present in the composition used to prepare the rubber backing layer 106 at about 3% to about 4% by weight. In still other aspects of an embodiment, the maleated compound is present in composition used to prepare the rubber backing layer 106 at about 2% to about 6% by weight.

In some embodiments, the rubber backing layer 106 is prepared from a rubber backing composition that further comprises fillers typically added to EPDM rubbers. Examples of fillers used in some embodiments include, for instance: silica, for example HiSil 243 LD™ (precipitated amorphous silica from PPG Industries; Monroeville, Pa.); zinc oxide, for example Kadox 930™ (zinc oxide, Zinc Corporation of America; Monaca, Pa.), Zano 20 (zinc oxide, Umicore Zinc Chemicals; Angleur, Belgium); calcium carbonate, for example Hubercarb Q325™ (ground calcium carbonate, Akrochem Corp.; Akron, Ohio); talc, for example Mistron® vapor R (hydrous magnesium silicate, Imerys Talc), Nytal Talc (hydrous magnesium silicate, R.T. Vanderbilt); carbon black, for example Continex™ N650 Carbon Black (carbon black, Continental Carbon; Houston, Tex.), Vulcan® XC72R (powdered carbon black, Cabot Corp.; Billerica, Mass.), silicates, aluminum silicate, titanium dioxide, and stearic acid.

The rubber backing composition has the advantage of allowing for high filler load, providing a more economical composition. In some embodiments the filler comprises from about 30% to about 65% by weight of the composition used to prepare the rubber backing layer. In other aspects of an embodiment, the filler comprises from about 30 wt % to about 60 wt %; from about 40 wt % to about 60 wt %; from about 45 wt % to about 60 wt %; from about 45 wt % to about 55 wt %; or from about 45 wt % to about 50 wt % compared to the total weight of the filled rubber backing composition.

In some embodiments, the rubber backing layer 106 is prepared from a rubber backing composition further comprising plasticizers. Example plasticizers used in some embodiments include polymer based types, such as polybutene, or paraffinic oils such as Sunpar 2280 DLC-A™ (paraffinic process oil silicon dioxide blend plasticizer, Natrochem Inc.), Drakeol® mineral oil (white mineral oil, Calumet Penreco; Dallas, Tex.), PD-23 White Oil (white mineral oil, Sonneborn, Inc.; Tarrytown, N.Y.). In some embodiments, the plasticizer is present at from about 0.1 wt % to about 25 wt %; about 1 wt % to about 20 wt %; about 5 wt % to about 15 wt %; about 7 wt % to about 12 wt %; about 8 wt % to about 10 wt %; about 9 wt % to about 11 wt %; or from about 9 wt % to about 10.5 wt % by weight of the composition used to prepare the rubber backing layer.

In some embodiments, the rubber backing layer 106 is prepared from a rubber backing composition further comprising a peroxidic vulcanizing agent. Examples of peroxides used in some embodiments include, for instance: dicumyl peroxide, di-t-butyl peroxide, and t-butyl cumyl peroxide, and commercial products, such as Luperox™ DC40P-SP2 (dicumyl peroxide extended on calcium carbonate and silica, Arkema) or Varox® DCP-99 (bis(1-methyl-1-phenylethyl) peroxide, R.T. Vanderbilt). In some embodiments, an efficient peroxide, such as a dicumyl peroxide, is preferable. In some embodiments, the peroxide is present at about 0.1 wt % to about 5 wt %; at about 1 wt % to about 4 wt %; at about 2 wt % to about 3 wt %; at about 1.5 wt % to about 2.5 wt %; at about 1.5 wt % to about 4 wt %; or at about 0.1 wt % to about 3 wt % by weight of the composition used to prepare the rubber backing layer. In some embodiments, because HVA-2 is a reactive Type I co-agent that increases reaction rate and state of cure, any efficient peroxide, such as a dicumyl peroxide, is employed in the rubber backing composition to ensure consistent free radical formation occurs.

In one embodiment, the rubber backing layer 106 is prepared from a rubber backing composition further comprising an antioxidant. Examples of antioxidants used in some embodiments include, for instance, Agerite MA™ (2,2,4-trimethyl-1,2-dihydroquinolone polymer) or Irgafos® 168 (tris (2,4-di-tert-butylphenyl)phosphite, Ciba). In some embodiments, the antioxidant is present at about 0.01 wt % to about 5 wt % by weight of the rubber backing layer composition. In other aspects of an embodiment, the antioxidant is present at about 0.05 wt % to about 3 wt %; 0.1 wt % to about 1.5 wt; or from about 0.1 wt % to about 1.0 wt % by weight of the composition used to prepare the rubber backing layer.

The rubber backing compositions provided herein are capable of a dual bonding mechanism for direct bonding to the polyamide layer without an intervening adhesive layer. The maleimide groups are capable of forming covalent C—C interactions with the carbon backbones of both the EPDM polymer and also the polyamide. Similarly, a possible bonding mechanism between the EPDM and the MA is through a C—C bond.

Surprisingly, one embodiment of the rubber backing layer 106 has demonstrated superior cold temperature performance. In contrast to other commercial formulations, such as Santoprene®, which shows leakage below 10° C., Example 7 of the rubber backing layer 106 unexpectedly extends the cold temperature range of the hose down to −40° C. to −60° C. Santoprene® is a thermoplastic elastomer that is a mixture of in situ crosslinking of EPDM rubber and polypropylene. In some embodiments, the rubber backing layer 106 is prepared from an EPDM composition that does not contain polypropylene. One example of cold temperature performance is described in more detail below with reference to Example 6.

Additionally, embodiments of the hose provided herein have demonstrated superior high temperature capability as compared to commercial product GH134. For example, the butyl backing layer in GH134 hose has a maximum high temperature capability of 120° C. In contrast, one embodiment of the hose provided herein, (Example 9, GH001) has an EPDM rubber backing layer with a maximum high temperature capability of 150° C. Additionally, the chlorobutyl cover of GH134 has a maximum high temperature capability of 120° C. An example embodiment of the hose provided herein, Example 7, has an EPDM cover with a maximum temperature capability of high 150° C. Thus, an example embodiment of the hose provided herein has a 30-degree increase in temperature capability.

The hose of FIG. 1 comprises a polyamide layer 104 in order to impart permeation resistance to the hose. The polyamide layer 104 is directly bonded, via the dual bonding mechanism, to the rubber backing layer 106 upon cure. In some embodiments, the polyamide layer 104 is prepared from a composition comprising PA6,6 and/or PA6. In some embodiments, the polyamide layer is prepared from a composition comprising PA 6,6. The polyamide layer 104 is a distinct layer from the rubber backing layer 106. That is, the components of the polyamide layer 104 are not present in the rubber backing layer 106. The polyamide layer 104 is a continuous layer.

In some embodiments, the polyamide layer 104 comprises a polyamide molding component that contains amide —CO—NH— bonds in its main chain and additives. The polyamides are prepared in a known manner by polycondensation. In some embodiments, the polyamide is selected from a polyamide wherein the ratio between the COOH and NH2 groups in the polyamide is preferably 1:x where 1<x<100. In some embodiments, heat stabilized polyamide resins are suitable. Examples of suitable nylon polyamides include PA 46 (polyamide 46; nylon 46), PA 6 (polyamide 6; nylon 6), PA 6,6 (polyamide 6,6; nylon 6,6), PA 11 (polyamide 11, nylon 11), PA 12 (polyamide 12; nylon 12), PA 612 (polyamide 612; nylon 6,12), and PA 610 (polyamide 610; nylon 6,10). In some embodiments, suitable nylon polyamides include PA 6, PA 6,6, PA 12 and PA 11. In still other embodiments, suitable nylon polyamides include PA 6 and PA 6,6. In yet other embodiments, suitable nylon polyamides include PA 6,6. In some embodiments, the polyamide layer 104 is prepared from a commercially available product, such as DuPont Zytel® 45HSB PA 6,6. In some embodiments, the polyamide layer 104 is from about 0.001" to about 0.01" thick; or from about 0.002" to about 0.008" thick. In some embodiments, the polyamide layer 104 is from about 0.003" to about 0.005" thick.

In some embodiments, the polyamide layer 104 is prepared from a polyamide composition further comprising additives such as reinforcing agents, flameproofing agents, stabilizers, processing auxiliaries, blowing agents, metal fibers, carbon black, graphite and metal leaf, titanium dioxide, colored pigments and zinc sulfide.

The hose of FIG. 1 comprises an inner resistance layer 102 for resistance to moisture ingression and oils. In some embodiments, the resistance layer 102 is prepared from a composition comprising a polyamide. In specific embodiments, the resistance layer 102 is prepared from a composition comprising PA 6, PA 6/12, PA 11, or PA 12. In some embodiments, PA 6 or PA 6/12 are used in the preparation of the resistance layer 102 because of their ability to directly bond to PA 6,6. In some embodiments, the resistance layer is a commercially available material, for example, DuPont Zytel® FN727. In other embodiments, the resistance layer 102 is prepared from a fluorinated polymer. In some embodiments, the fluorinated polymer is, for example, polyvinylidene fluoride (PVDF). In some embodiments, the resistance layer 102 is used as an oil barrier. In some embodiments, the resistance layer 102 is from about 0.006" to about 0.01" thick; from about 0.007" to about 0.008" thick; from about 0.007" to about 0.009" thick; or from about 0.0065" to about 0.0085" thick.

In some embodiments, the resistance layer 102 and the polyamide layer 104 are formed by coextruding PA6 and PA 6,6 to form a plastic veneer.

In the hose of FIG. 1, the polyamide layer 104 and the rubber backing layer 106 are chemically covalently bonded together without the use of adhesive. In one embodiment, the rubber backing layer 106, prepared from a composition comprising EPDM, MAH, and HVA-2, bonds directly to the polyamide layer 104 comprising nylon 6,6 upon cure.

Although the exact bonding mechanism between the layers is unclear, a possible bonding mechanism, which occurs through, for example, traditional press cure or extrusion processing methods exploits two different mechanisms. First, the MA might bond to the amine end of nylon 6,6 forming a C—N bond by Diels-Alder chemistry. Second, the cyclic carbon on the maleimide groups might form covalent C—C interactions to the nylon 6,6 backbone through an "Alder-ene" reaction using a free radical mechanism. In one embodiment, the polyamide layer 104 and the rubber backing layer 106 undergo shearing and vulcanization at a temperature of about 300-350° F.

The cover layer 110 has the largest outer diameter of the layers. In some embodiments, the cover layer 110 comprises a rubber, for example, EPDM. In a preferred embodiment, the cover layer is prepared from a composition comprising an EPDM compound capable of maintaining a seal at low temperatures. In some embodiments the EPDM is made with low ethylene so it has low temperature capability. In some embodiments, the cover layer comprises a peroxide cured EPDM made with low ethylene content. In some embodiments, there is no adhesive between the cover layer 110 and the reinforcement layer 108.

The reinforcement layer 108 comprises a textile. Examples of suitable textiles for the reinforcement layer 108 include aramid, polyester braid, nylon, cotton, and rayon. In some embodiments, the reinforcement layer 108 is a discontinuous layer. In some embodiments, the reinforcement layer 108 is a discontinuous layer comprising a polyester braid, aramid, nylon, cotton, or rayon. In some embodiments, the cover layer 110 and the rubber backing layer 106, migrate through the interstices of the textile in the reinforcement layer 108 and vulcanize together.

In some embodiments, the hose comprises five layers. In one embodiment, the inner diameter of the hose resistance layer 102, the innermost layer, is 0.585"±0.015". In other embodiments, the inner diameter of the resistance layer 102 is 0.705"±0.015". In still other embodiments, the inner diameter of the resistance layer 102 is 0.785"±0.015". In yet other embodiments, the inner diameter of the resistance layer 102 is 0.975"±0.015".

EXAMPLES

A hose according to the invention, comprising a rubber backing layer that directly bonds to a polyamide permeation veneer, was developed for automotive use. EPDM was selected for use as the base thermoplastic elastomer polymer for use in preparation of the rubber backing layer 106 of the hose in order to maintain heat resistance upwards of 160° C. while simultaneously maintaining the low temperature sealing capability (−50° C.) desirable for a refrigerant hose.

Compression set (C Set) is one of the primary characteristics of a rubber compound directing low temperature sealing capability. EPDM ethylene content is the primary factor influencing this compression effect. As the ethylene content increases, a low-level of crystallinity develops above 55%-65%. If the ethylene/propylene ratio is about equal and the distribution of both monomers in the polymer chain is random then the EPDM is amorphous. Polymers with ethylene content above 60% tend to show high compression set, while the amorphous (less than 60% ethylene) materials provide decreased set values at low temperatures.

A Banbury™ mixer (Farrel Corporation) was used to mix the different rubber formulations according to ASTM D 3182-07. First, the polymer was added first into the mixer in a 30 second mastication cycle at 150° C. Second, fillers and oils were added in a 120 second mix cycle at 200° C. Then, process aids, such as vulcanizing agents, were added in a 120 second mix cycle at 220° C. Fourth, the composition undergoes a fourth mix cycle for 90 seconds at 220° C. Then the master batch rubber is inserted into the mixer with the curatives and mixed for 120 seconds at 180° C., followed by a final mix for 120 seconds at 180° C.

After the rubber drops from the mixer, the rubber was manually applied to a dual-roll mill and sheeted until the thickness is 0.75"-1.25", according to ASTM B 947-06. The dual roller mill stage sheets and cools the mixed formulation.

The cure kinetics of the rubber formulations were assessed according to ASTM D 2084-95 (cure study). Rheometry was measured using a Monsanto RPA2000 for 45 minutes at 160° C.

The sheeted material then was subjected to the cure press for vulcanization. Based on T90 values from the cure study, the sheeted material from the dual roller mill was inserted into the cure press and vulcanized at 320° F. for 45 minutes.

Next, the rubber underwent a Shore A hardness test. In accordance with ASTM D 2240-95, the hardness was tested using a calibrated Instron automatic Durometer tester. The compression set was tested in accordance with ASTM D 395-89. The sample was prepared as follows. First, the EPDM rubber was vulcanized for 60 minutes at 320° F. into 0.49" thick by 1.14" diameter buttons. Then the buttons were compressed by 25% into a C Set fixture. After curing, the samples were exposed at −40° C. for 24 hours and samples were removed and measured at specified time increments. The time versus percent compression was then plotted on a graph, shown in FIG. 9. Last, the overall compression set was assessed on a sample that was allowed to run the full 24 hours and then rebound at room temperature outside of the C Set fixture prior to the final measurement.

The strip adhesion test was conducted in accordance with ASTM D 413-81. This test measured the adhesion strength between various embodiments of the rubber backing layer with an embodiment of the polyamide layer. Specimen Type B—90° peel was used. The sample was prepared using polyamide 6,6 injection molded samples that were 4" long, 1" wide, and 0.075" thick. The PA 6,6 samples were laid on top of rubber samples that were 4" long, 1" wide and 0.09" thick, on a standard press cure. The samples were vulcanized for 45 minutes at 320° F. Twenty-four hours after vulcanization, the samples were tested on a calibrated Instron 5965 (according to ASTM D413 Type B (90° C. peel)) using a 5 KN load cell at a rate of 2"/min. Tensile strength and percent elongation were tested in accordance with ASTM 412. Standard ASTM samples were tested on a calibrated Instron 5965 using a 5 KN load cell at a rate of 20"/min.

The Green Rubber Shelf Life test evaluated how the measurements changed over time. Samples were cured at time intervals over 3 months (45" at 320° F.) from a standard uncured stock. Those samples underwent tests according to ASTM 412, ASTM D 2084-95, and ASTM D 413-81.

Permeation of test hose and comparative product hose Y was tested in accordance with SAE J2064. Samples were stabilized for 24 hours at 23° C.±2° C. before testing and checked to ensure specified charge and identify charge loss.

Figure 2:
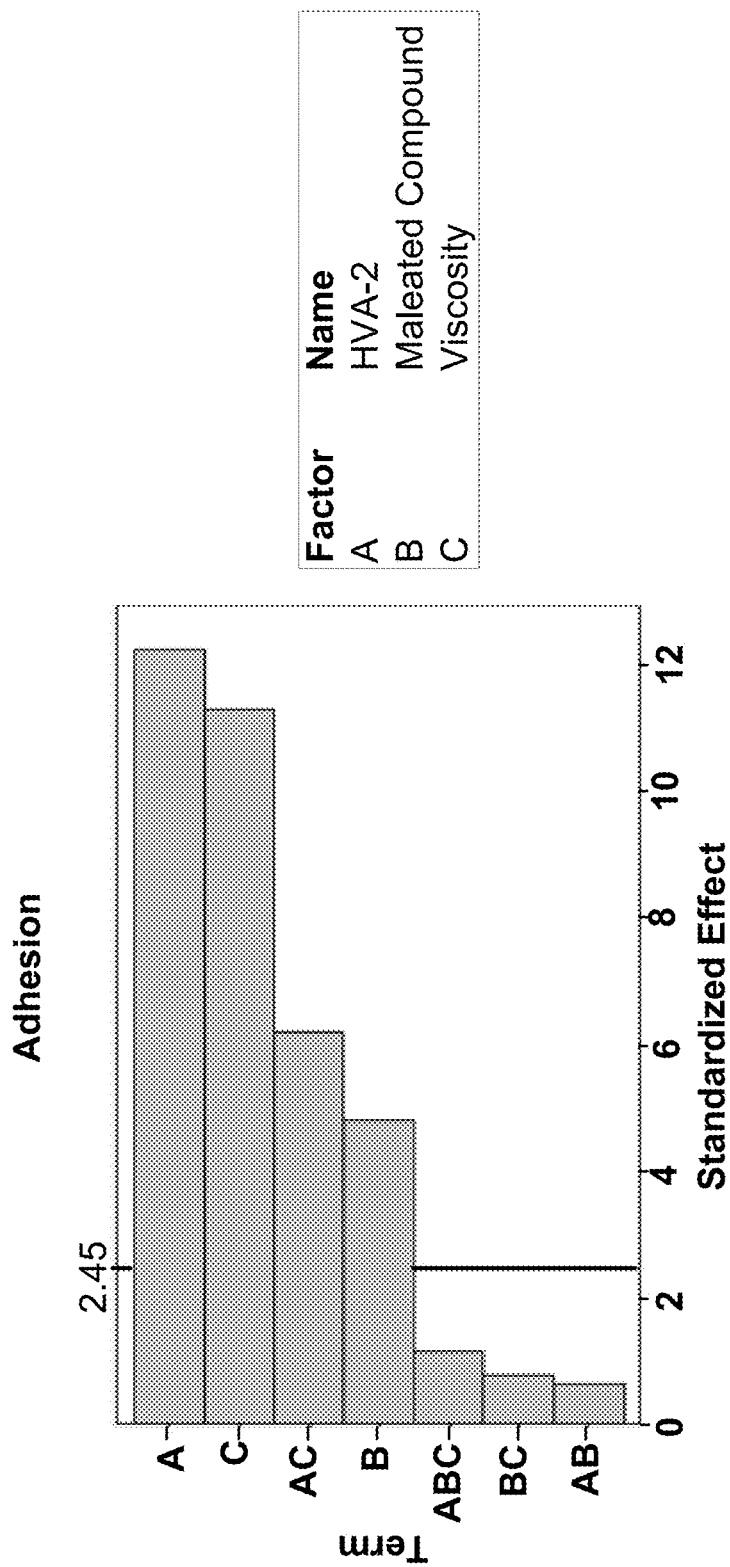
FIG. 2 is a Pareto chart of the standardized effects on adhesion of phenylenedimaleimide, the maleated compound, and EPDM polymers with similar ethylene percentages but varying viscosities, with an alpha=0.04.

Example 1. Strip Adhesion Between Rubber Backing and Polyamide Layers—Bonding Effect Factors To investigate the bonding effect between embodiments of the rubber backing and polyamide layers, sixteen different mixes were tested using a maleated compound comprising silica grafted with maleic anhydride (MA), HVA-2 (phenylenedimaleimide) and two EPDM polymers with similar ethylidene norbornene (ENB) and ethylene percentages but varying (high and low) viscosities. The results for strip adhesion (ASTM D413) are displayed in the Pareto chart of FIG. 2. The alpha for the Pareto chart is 0.04. The data show that factors that extend beyond an effect of 2.45 had a significant effect on adhesion.

The data suggest that the primary factor affecting adhesion is the HVA-2, followed by polymer viscosity, maleic anhydride content and then some insignificant synergistic relationships between the mentioned reagents.

Figure 3:
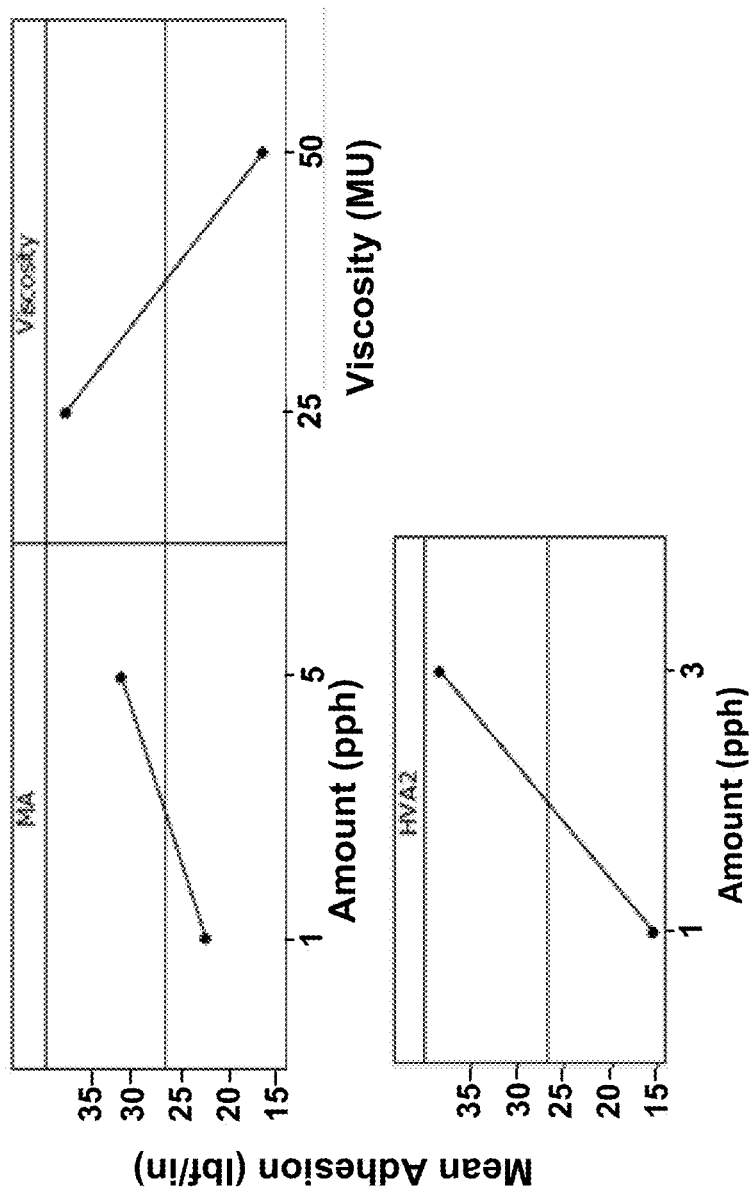
FIG. 3 illustrates main effects plots for adhesion (lbf/in), showing the data means of the mixes used to produce the data in FIG. 2 for each of the HVA-2, maleated compound, and EPDM polymers with similar ethylene percentages but varying viscosities.

The plots in FIG. 3 depict main effects plots for adhesion, showing the data means of the sixteen mixes of Example 1. The data in FIG. 3 show that HVA-2 and maleic anhydride inclusion results in increasing rubber to plastic adhesion while increasing polymer viscosity has an inverse relationship to substrate bonding. These statements are made by observation of direction and severity of plot slope for each result as concentration is increased.

Figure 4:
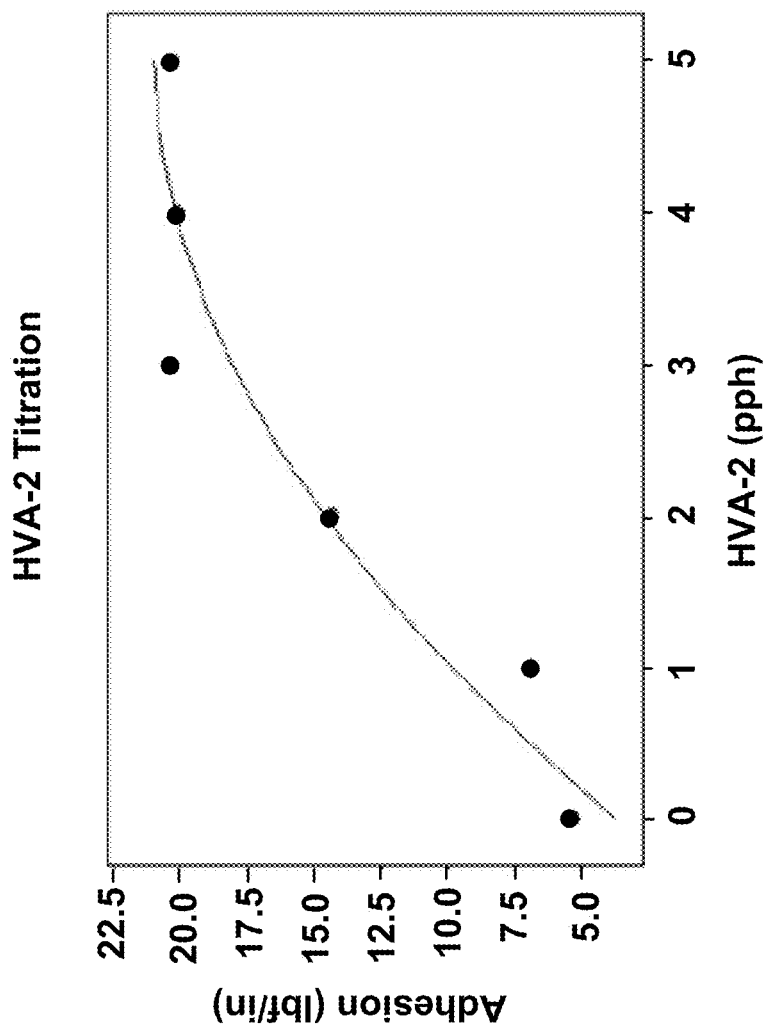
FIG. 4 illustrates a regression analysis of varying the HVA-2 concentration in an example embodiment on adhesion (lbf/in).

Example 2. Strip Adhesion Between Rubber Backing and Polyamide Layers—HVA-2 Titration A regression analysis was next performed by titrating T(MPBM) D-70 HVA-2 reagent from 0 pph to 5 pph and testing for adhesion to PA 6,6. Afterwards, the results for HVA-2 (pph) versus adhesion (lbf/in) were plotted in a quadratic manner in FIG. 4. The data are fitted with a regression fitted line, the quadratic equation being Adhesion=$3.682+6.810(HVA-2)-0.6668(HVA-2)^2$. The R2 of the fit is 92.9% and the adjusted R2 of the fit is 88.2%. The residual standard deviation is 2.40567.

The curve details the saturation kinetics associated with the free radical phenylenedimaleimide reaction whereby the cyclic carbon on the maleimide groups form covalent C—C interactions with the carbon backbones of both the EPDM polymer and also the polyamide.

Example 3. Strip Adhesion Between Rubber Backing and Polyamide Layers—Maleated Compound Titration The effect of varying the maleated compound content was assessed through a regression analysis where the amount of an example maleated compound, Ricobond® 1756 HS, was increased from 0 pph to 20 pph through five experimental formulations. All other reagents including HVA-2 were held constant. Afterwards, the results for the maleated compound (pph) versus adhesion (lbf/in) were plotted in a quadratic manner in FIG. 5. The data are fitted with a regression fitted line, the quadratic equation being Adhesion=$17.07+1.088$ (Ricobond® 1756 HS)$-0.03554$(Ricobond® 1756 HS)$^2$. The R2 of the fit is 96.1% and the adjusted R2 of the fit is 94.2%. The residual standard deviation is 0.819977.

Figure 5:
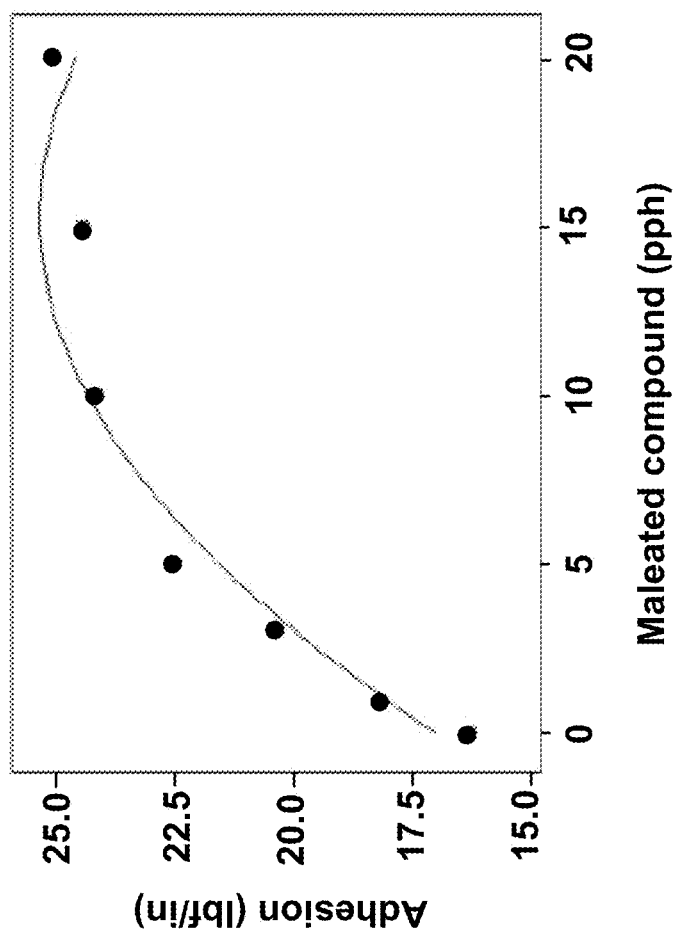
FIG. 5 illustrates a regression analysis of varying the maleated compound concentration (pph) in an example embodiment on adhesion (lbf/in).

The results for adhesion in FIG. 5 suggest that saturation of the maleic anhydride reaction to the polyamide n-terminal amine occurred somewhere around 10 pph.

Note that at 0 pph there is already about 16 lbf/in of adhesive force due to the presence of 3 pph HVA-2 and the final saturated adhesion was found to be about 24 lbf/in. This validates the hypothesis that the HVA-2 and maleic anhydride reactions are non-competitive and generate a "compounding" effect since an additional 8 lbf/in is generated above the HVA-2 saturation level. This makes sense because HVA-2 forms a covalent bond (C—C bond) with the carbon backbone of the polyamide while maleic anhydride interacts with the polyamide N-terminal amine group (C—N bond).

Example 4. Strip Adhesion Between Rubber Backing and Polyamide Layers—Effect of Plasticizers and Fillers Example 4 investigated the effects of other standard reagents, plasticizer and carbon black fillers, on adhesion quality. Plasticizers used in this study include both paraffinic and a polymer based (polybutene) types. While paraffinic plasticizers such as Lubspar 2280 are generally used in EPDM compounds, there is some concern that it might affect adhesion by blooming to the surface of the rubber and ruining the rubber/plastic interface. Conversely, polymeric plasticizers generally do not migrate through the rubber resulting in accumulation at the material surface. They are however more expensive and difficult to manipulate at the production level due to their very high 14230 SUS viscosity versus paraffinic oil (2582 SUS).

Figure 6:
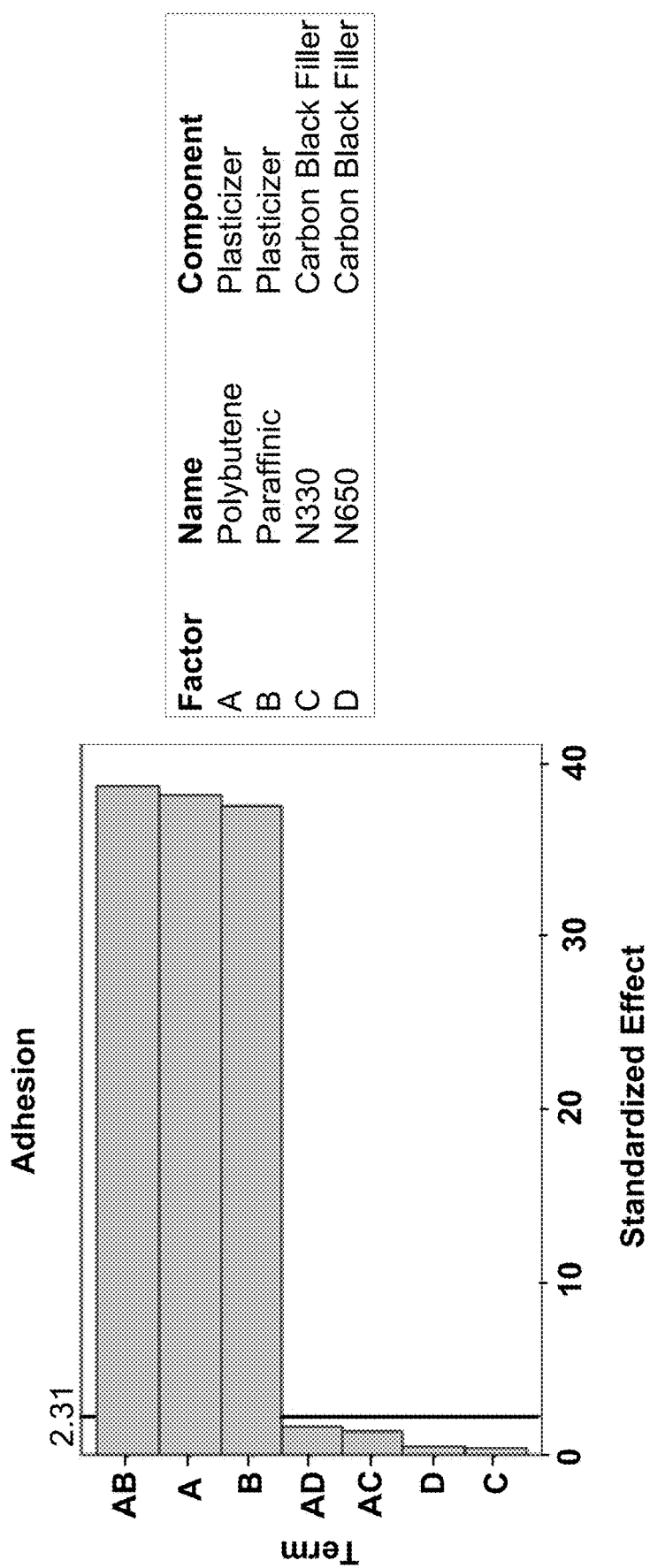
FIG. 6 is a Pareto chart of the standardized effects on adhesion for concentrations (pph) of polybutene plasticizer, paraffinic oil plasticizer, N330 carbon black and N650 carbon black, with an alpha=0.05.

The results for strip adhesion (ASTM D413) are displayed in the Pareto chart of FIG. 6. The response is adhesion and the alpha for the Pareto chart is 0.05. Factors that extend beyond an effect of 2.31 had a significant effect on adhesion. The results depicted in FIG. 6 imply that both forms of plasticizer affect adhesion to an equal extent and together exert a significant response in comparison to the filler additions.

Figure 7:
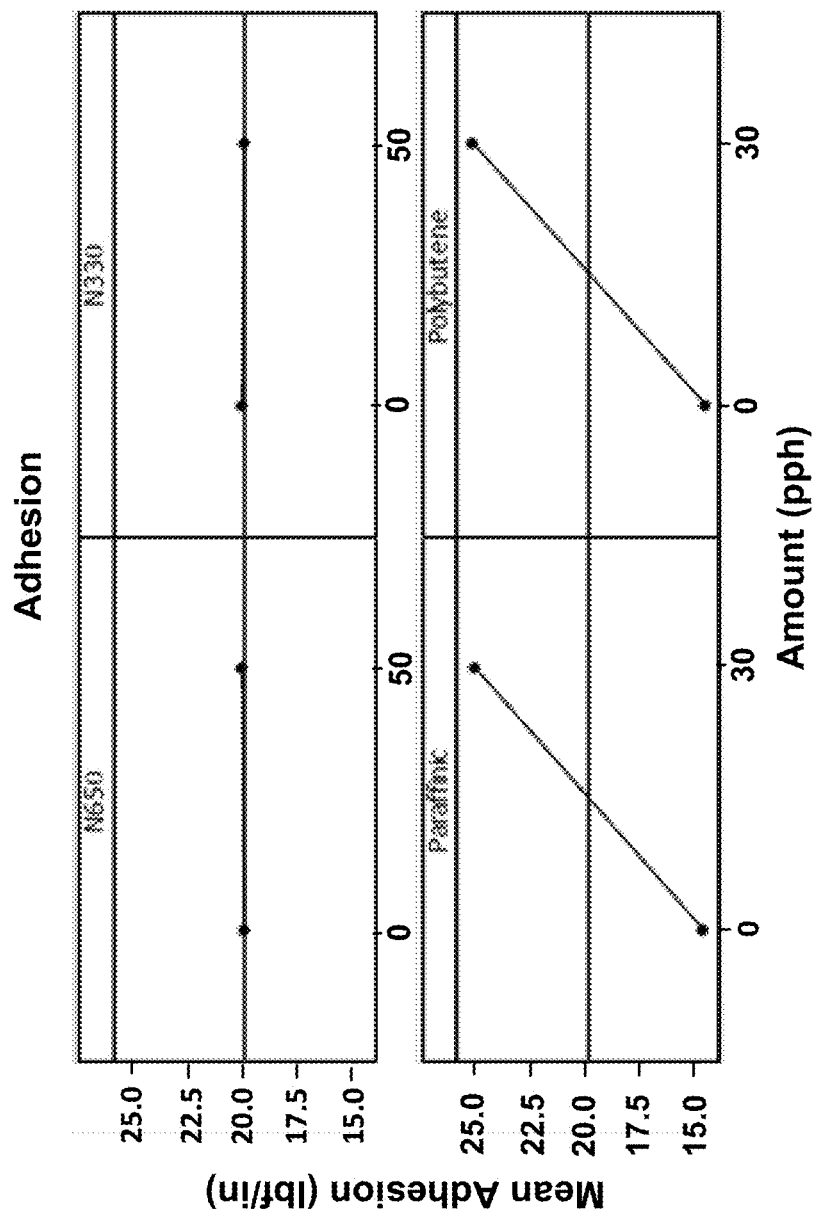
FIG. 7 is a main effects plot for adhesion (lbf/in), showing the means of adhesion when various concentrations (pph) of polybutene plasticizer, paraffinic oil plasticizer, N330 carbon black and N650 carbon black were varied.

FIG. 7 is the main effects visual chart of Example 4 for adhesion. The data in FIG. 7 show that the plasticizer effects are equal and necessary since increasing amounts have a direct correlation on improved adhesion values.

Additionally, this data set suggests that carbon black type and amount has minimal effect on rubber to plastic adhesion. In Example 7, the Lubspar/Sunpar paraffinic type oil was used because it is easier to handle, numerous suppliers exist and it has a favorable price in comparison to the polybutene plasticizer.

Example 5. Shelf Life of Rubber Backing Layer Green Material

Examples 1-5 identified the type and amount of reagents used in an embodiment of the rubber backing layer. Another study was performed to investigate shelf life of an uncured embodiment of the rubber backing layer, Example AB. "Green" samples were intermittently removed from the production lot and cured over a two month period according to ASTM D3182 (45 minutes at 320° F.). Additionally, strips of injection molded PA 6,6 were applied to half of the sheet rubber and tested according to ASTM 413-81 for strip adhesion.

Figure 8:
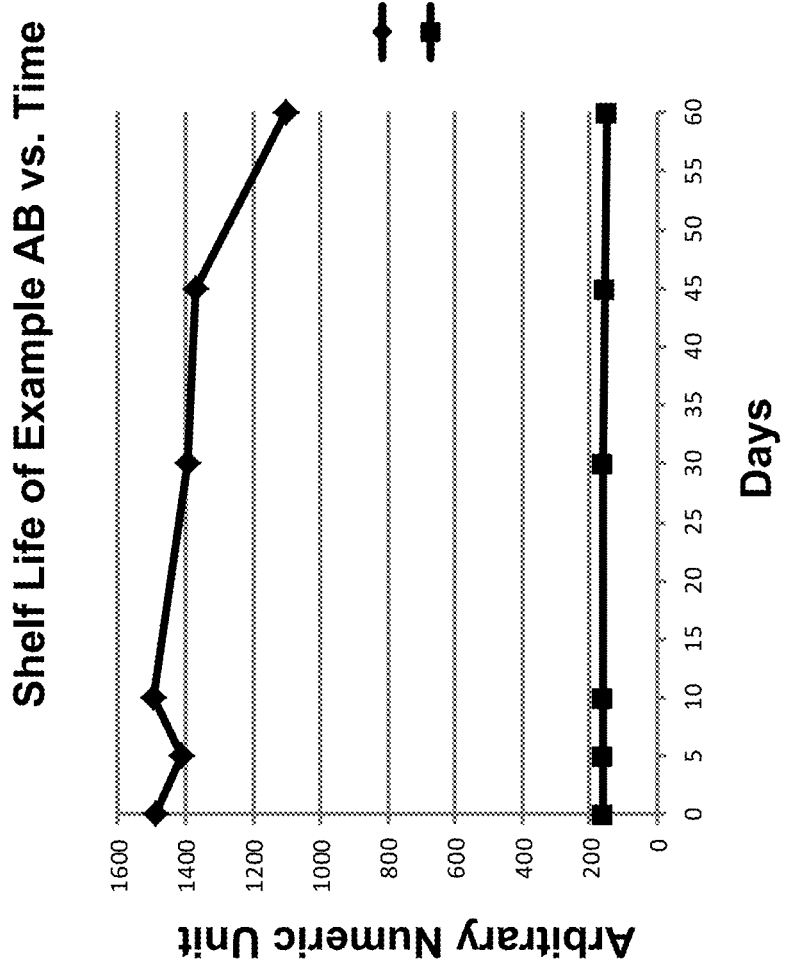
FIG. 8 illustrates the tensile strength and percent elongation over time of "green" samples of an example rubber formulation according to a formulation of Example 7 that were cured over a two month period according to ASTM D3182.

The results plotted in FIG. 8 imply that shelf life of an embodiment of the rubber backing layer, AB, is good for 45 days because until 45 days elapses, the tensile strength and percent elongation lose less than 25% versus the original time zero values. After 45 days the material loses significant amounts of its physical properties. Interestingly, while the physical properties declined, the bonding capability remained the same throughout the 60 day trial.

Example 6. Compression Set Properties of Rubber Backing Layer

Figure 9:
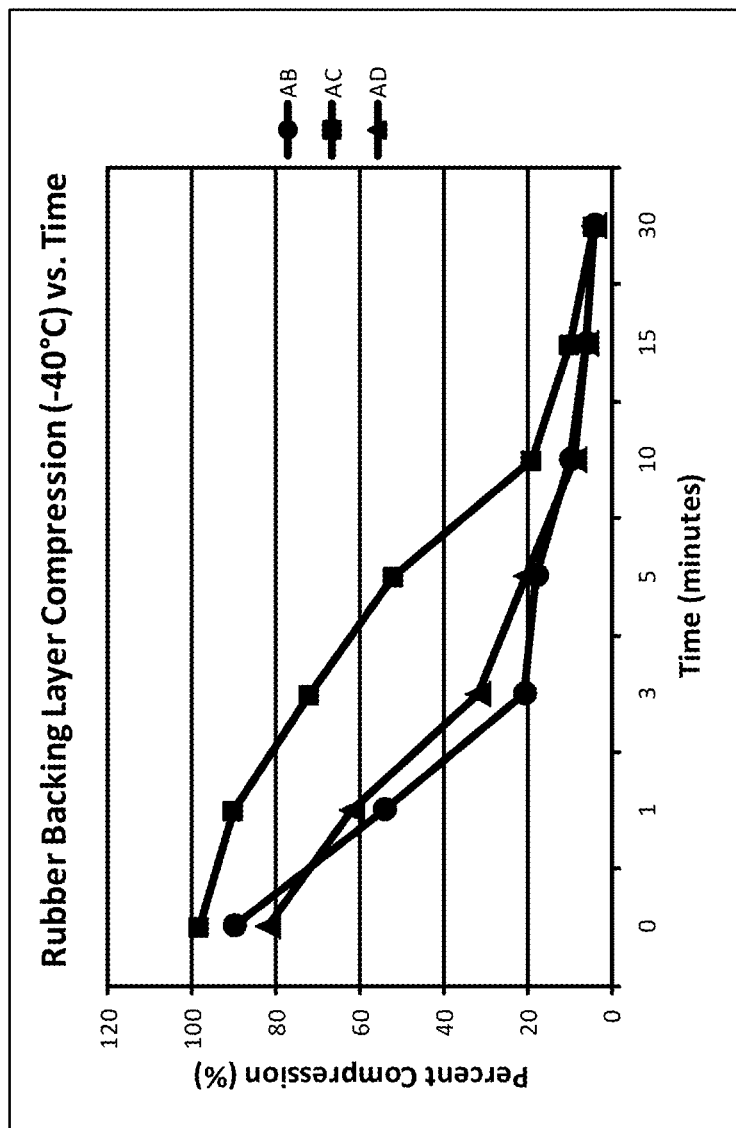
FIG. 9 illustrates the percent compression of three different rubber backing layers at −40° C. over time, after platen or steam curing.

A backing layer compression experiment was performed to assess the cold (−40° C.) compression set properties of the rubber backing layer. A cured layer according to Example 7 was tested according to ASTM 395, to validate its sealing capability, and to compare cold compression set properties to two different control backing layers of comparative products AC and AD. The results are depicted in FIG. 9. Hypothetically, since the polymer ethylene level of AB (50%) is the same as the AD compound (low temperature coolant tube or cover), the cold compression should be equivalent. However, this was not the case. Also tested was a low temperature compression control, AC, which is a standard 70% ethylene EPDM formulation. After either platen or steam curing, the samples were exposed to −40° C. for 24 hours according to ASTM 395-89, removed from the C set fixture and measured at time intervals up to 30 minutes. The test measures the % rebound as a function of time. An increased rate is indicative of faster material recovery during warming cycle.

FIG. 9 characterizes this phenomenon by plotting the kinetics of percent compression versus time. The data suggest that a rubber backing layer according to Example 7 following cure of, Test AB, compares well to comparative GH134 backing layer compression of AD since both rebound at a rate of about 35% faster based on calculated slopes than the AC control compound.

Example 7. Rubber Backing Compositions

The following Example 7 rubber backing composition was prepared according to the protocols above.

TABLE 1

Rubber Backing Composition A.

| Ingredients | Component | PPH | % Content | Grams |
|---|---|---|---|---|
| Vistalon 2504 | EPDM | 100.00 | 34.42 | 499.14 |
| Hubercarb Q 325 | calcium carbonate | 15.00 | 5.16 | 74.87 |
| MISTRON VAPOR R | talc | 10.00 | 3.44 | 49.91 |
| HI-SIL 243 LD | silicon dioxide, amorphous | 20.00 | 6.88 | 99.83 |
| LUBSPAR 2280 (SUNPAR 2280) | paraffinic process oil silicon dioxide blend plasticizer | 30.00 | 10.33 | 149.74 |
| KADOX 930 | zinc oxide | 5.00 | 1.72 | 24.96 |
| AGERITE MA | antioxidant | 1.00 | 0.34 | 4.99 |
| T(MPBM)D-70 | HVA-2 | 3.00 | 1.03 | 14.97 |
| RICOBOND 1756 HS | maleated polybutadiene | 10.00 | 3.44 | 49.91 |
| N650 BLACK | carbon black | 90.00 | 30.98 | 449.23 |
| LUPEROX DCP-40P-SP2 | dicumyl peroxide | 6.50 | 2.24 | 32.44 |
| | Totals: | 290.5 | 100 | 1450 |

The rubber backing layer prepared from Example 7 rubber backing composition A exhibited desirable characteristics upon cure. Using a moving die rheometer at 157° C., 0.5 Arc, 100 cpm, and 30 minutes, the rubber backing layer prepared according to Example 7 had a T5 of 5 min; a Mooney viscosity of 41 MU; adhesion greater than 10 lbf/in; tensile strength 1,472 psi; elongation 148% and cost $1.35/lb. In addition, the backing layer prepared from Example 7 rubber backing composition A exhibited desirable direct bonding to polyamide 6,6 veneer, and multi-refrigerant/oil compatibility.

Example 8. Cover Layer Composition

The following Example 8 cover layer composition was prepared according to the protocols above.

TABLE 2

Cover Layer Composition.

| Ingredients | Component | PPH | % Content | Grams |
|---|---|---|---|---|
| BUNA EP G 6850 | EPDM | 100.00 | 34.63 | 502.16 |
| N650 BLACK PELLETIZED | Carbon black | 85.00 | 29.44 | 426.84 |
| N990 BLACK | Carbon black | 35.00 | 12.12 | 175.76 |
| HI-SIL 243LD | silicon dioxide, amorphous | 10.00 | 3.46 | 50.22 |
| SUNPAR 2280 | paraffinic process oil silicon dioxide blend plasticizer | 40.00 | 13.85 | 200.87 |
| F-2000 STEARIC ACID | Stearic Acid | 1.00 | 0.35 | 5.02 |
| ANTIOXIDANT DQ | Antioxidant | 1.50 | 0.52 | 7.53 |
| MAGCHEM HSA-10 | Magnesium oxide | 5.00 | 1.73 | 25.11 |
| REDIMIX 9595 | Oil-treated powder | 0.55 | 0.19 | 2.76 |
| VUL-CUP 40KE | benzoyl peroxide crosslinking agent | 1.50 | 0.52 | 7.53 |
| SARET SR633 | zinc diacrylate | 2.20 | 0.76 | 11.05 |
| VAROX DBPH-50-HP | dicumyl peroxide | 7.00 | 2.42 | 35.15 |
| | Totals: | 288.75 | 100 | 1450 |

As shown in Table 2, the cover layer was prepared using the following ingredients: Buna® EP G 6850 (an ethylene-propylene-diene rubber (EPDM), amorphous; with ethylidene norbornene as termonomer and about 51% by mass ethylene according to ASTM D 3900, Lanxess Corporation); N650 Black Pelletized (Carbon Black, Cabot); N990 Black (Carbon Black, Cancarb); Hi-Sil243D (precipitated amorphous silica from PPG Industries; Monroeville, Pa.); Sunpar 2280 (paraffinic process oil silicon dioxide blend plasticizer, Natrochem Inc.); F-2000 Stearic Acid (stearic acid and palmitic acid, Harwick Standard Distribution Corporation); Antioxidant DQ (polymerized 2,2,4-trimethyl-1,2-dihydroquinoline, Akrochem Corp.); Magchem HSA-10 (magnesium oxide, Martin Marietta); Redimix 9595 (oil-treated powder, Hexpol Compounding); Vul-cup 40KE (benzoyl peroxide crosslinking agent, Hercules Inc.); Saret SR633 (anhydrous zinc diacrylate, Sartomer); and Varox DBPH-50-HP (2,5-Dimetyl-2,5-di(t-butylperoxy)-hexane, R.T. Vanderbilt Company, Inc.).

Example 9. Hose Comprising Rubber Backing Layer Directly Bonded to a Polyamide Layer A hose was prepared according to the invention comprising an inner resistance layer comprising PA6; a polyamide layer comprising PA 6,6 directly bonded to; a rubber backing layer prepared from rubber backing composition A, Example 7; a reinforcement layer; and an outer cover layer prepared from a composition according to Example 8. PA6 and PA6,6 were co-extruded on mandrel to make veneer. The backing layer was extruded on top of veneer. The braid Reinforcement layer was applied and the cover layer was extruded over the braid. The assembly was subjected to vulcanization and the mandrel was expelled from the hose construct.

The resultant hose, GH001, has a PA6 oil barrier 102, followed by a PA6,6 permeation layer 104, then a direct bond EPDM rubber backing layer 106 according to Example 7 with max temp of 150° C., then a polyester braid 108, and finally an EPDM cover layer 110 (max 150° C.) according to Example 8. The EPDM and lack of adhesive give GH001 a temperature capability of 150° C.

Example 10. Hose Permeation Testing

The test hose of Example 9 GH001 was compared to commercially available GH134 hose and tested with refrigerant gases R-134a and R1234-yf. In this example, test hose product X, GH001, was compared to comparative hose product Y, a GH134 hose. GH134 has a PA6 oil barrier as the inner layer, then a butyl backing layer is adhered to the oil barrier layer with Robond™ adhesive, then a polyester braid as a reinforcement layer and a chlorobutyl cover layer (max 120° C.). As noted above, the example rubber formulation of Example 7 demonstrated other improved qualities, such as a temperature capability that is thirty degrees higher than GH134. The tests were performed in accordance with SAE J2064.

Specifically, the charged samples were stabilized for 24 hours at 23° C.±2° C. prior to testing. The test specimens consisted of four coupled hose assemblies that have 107 cm±1.2 cm of exposed hose between couplings. Three of the coupled hose assemblies were used for determining the permeation rate through the test and control hoses of refrigerants R-134a and R1234-yf at specific temperatures. The fourth coupled and plugged hose assembly was used for a control hose. One end of each hose assembly was attached to a canister. The other end was capped with a plug. The coupled hose assemblies were weighed and recorded to 0.01 g to establish an initial weight prior to charging. The test samples were evacuated and then charged with refrigerant to 70%±3% of the internal volume of the assembly and then reweighed. The weights were taken at room temperature. The test temperature was 80° C.±2° C. The samples were weighed at the end of the first 24 hour temperature exposure and at period intervals. The weighings were reported in net loss of grams, calculated by charged sample weight loss minus control sample weight loss. The net weight loss versus time was recorded for 25 days. Conversion factors were then used to calculate the kg/m2/year rate of permeability.

Test hose X, GH001, when tested according to SAE J2064, had a permeation value of 2 kg/m2/yr for refrigerant R-134a. When tested according to the same SAE standard, the comparable rubber formulation, comparative product Y, GH134, had a permeation value of 5.5 kg/m2/yr for refrigerant R-134a. R-134a is 1,1,1,2-tetrafluoroethane, also known as Genetron 134a, Suva 134a, and HFC-134a. R-1234-yf, a newer refrigerant, was also tested. R-1234-yf is 2,3,3,3-tetrafluoropropene, also known as HFO-1234yf and 2,3,3,3-tetrafluoropropylene. Using the newer, different refrigerant, R1234-yf, example rubber formulation X, when tested according to SAE J2064, had a permeation value of 1.2 kg/m2/yr. When tested according to the same SAE standard, the comparable rubber formulation, comparative product Y, had a permeation value of 3.5 kg/m2/yr for refrigerant R-1234-yf. It is therefore clear that example product X, GH001, comprising an embodiment of the rubber backing layer, exhibits at least a two-fold improvement in permeability compared to GH134 hose. The results are depicted in Table 3 below.

TABLE 3

Permeation of test hose, GH001, product X, and comparative control hose, GH134, product Y, to refrigerants R-134a and R1234-yf according to SAE J2064.

| Hose | Refrigerant | Permeation |
|---|---|---|
| Comparative product Y | R-134a | 5.5 kg/m$^2$/yr |
| Example rubber formulation X | R-134a | 2 kg/m$^2$/yr |
| Comparative product Y | R1234-yf | 3.5 kg/m$^2$/yr |
| Example rubber formulation X | R1234-yf | 1.2 kg/m$^2$/yr |

Although the invention has been described and has been illustrated in connection with certain specific or preferred inventive embodiments, it will be understood by those of skill in the art that the invention is capable of many further modifications. This application is intended to cover any and all variations, uses, or adaptations of the invention that follow, in general, the principles of the invention and include departures from the disclosure that come within known or customary practice within the art and as may be applied to the essential features described in this application and in the scope of the appended claims.

What is claimed is:

1. A hose, comprising a multiplicity of layers including:
   a rubber backing layer directly bonded to a polyamide (PA) layer, without an intervening adhesive layer,
   wherein the rubber backing layer is prepared from a first composition comprising a blend of a low ethylene EPDM having no more than about 60 wt % ethylene content, at least 2 pph phenylenedimaleimide compared to the EPDM, and a maleated compound,
   wherein the rubber backing layer exhibits adhesion to the polyamide layer of greater than 10 lbf/in when tested according to ASTM D413, and
   wherein the rubber backing layer material is capable of exhibiting cold temperature compression set of no more than about 40% after 5 minutes following compressing by 25%, exposing to −40° C. for 24 hours, and allowing to rebound at room temperature under ASTM D395.

2. The hose of claim 1, wherein the EPDM is present in the first composition within a range of from about 20 wt % to about 60 wt % compared to the total weight of the first composition.

3. The hose of claim 2, wherein the EPDM is present in the first composition within a range of from about 30 wt % to about 40 wt % compared to the total weight of the first composition.

4. The hose of claim 1, wherein the low ethylene EPDM has an ethylene content in the range of from about 45 wt % to no more than about 60 wt % ethylene compared to the total weight of EPDM.

5. The hose of claim 1, wherein the phenylenedimaleimide is present in the first composition within a range of from 2 pph to 5 pph compared to the EPDM in the first composition.

6. The hose of claim 1, wherein the phenylenedimaleimide is N,N'-m-phenylenedimaleimide.

7. The hose of claim 1, wherein the maleated compound is present in the first composition within a range of from about 0.1 wt % to about 10 wt % of the total weight of the first composition.

8. The hose of claim 1, wherein the maleated compound is present in the first composition within a range of from about 0.5 wt % to about 5 wt % of the total weight of the first composition.

9. The hose of claim 1, wherein the maleated compound is maleated polybutadiene.

10. The hose of claim 1, wherein the first composition further comprises a plasticizer.

11. The hose of claim 10, wherein the plasticizer is present in the first composition within a range of from about 0.1 wt % to about 25 wt % of the total weight of the first composition.

12. The hose of claim 11, wherein the plasticizer is present in the first composition within a range of from about 1 wt % to about 20 wt % of the total weight of the first composition.

13. The hose of claim 10, wherein the plasticizer is selected from the group consisting of polybutene, mineral oil, and paraffinic plasticizer.

14. The hose of claim 13, wherein the paraffinic plasticizer is a paraffinic process oil silicon dioxide blend plasticizer.

15. The hose of claim 1, wherein the first composition further comprises a filler.

16. The hose of claim 15, wherein the filler is present within a range of from about 30 wt % to about 60 wt % compared to the total weight of the first composition.

17. The hose of claim 16, wherein the filler is present within a range of from about 40 wt % to about 60 wt % compared to the total weight of the first composition.

18. The hose of claim 15, wherein the filler comprises one or more fillers selected from the group consisting of carbon black, silica, silicates, talc, aluminum silicate, calcium carbonate, zinc oxide, titanium dioxide and stearic acid.

19. The hose of claim 18, wherein the filler comprises a carbon black and a silica.

20. The hose of claim 1, wherein the first composition further comprises an antioxidant within a range of from about 0.05 wt % to about 3 wt % compared to the total weight of the first composition.

21. The hose of claim 20, wherein the first composition further comprises an organic peroxide within a range of from about 0.1 wt % to about 5 wt % compared to the total weight of the first composition.

22. The hose of claim 21, wherein the organic peroxide is selected from the group consisting of dicumyl peroxide and t-butyl cumyl peroxide.

23. The hose of claim 1, wherein the polyamide layer is prepared from a second composition comprising one or more of the group consisting of polyamide 6,6; polyamide 6; and polyamide 6/12.

24. The hose of claim 23, wherein the second composition comprises polyamide 6,6.

25. The hose of claim 1, wherein the polyamide (PA) layer is a continuous layer.

26. The hose of claim 1, wherein the polyamide (PA) layer is an inner layer, and the rubber backing layer is an outer layer.

27. The hose of claim 1, wherein the rubber backing layer material exhibits an uncured shelf life of at least 45 days, wherein the tensile strength and percent elongation values when stored uncured for up to at least 45 days lose less than 25% compared to original time zero values when tested according to ASTM D3182 after curing samples of the material for 45 minutes at 320° F.

28. The hose of claim 1, wherein the hose exhibits a permeation value of less than 3 kg/m$^2$/yr for a refrigerant selected from the group consisting of R134a (1,1,2-tetrafluoroethane) and R-1234-yf (2,3,3,3-tetrafluoropropene) when tested according to SAE J2064 at 80° C.+/−2° C.

29. The hose of claim 28, wherein the hose exhibits a permeation value of less than 2 kg/m$^2$/yr for a refrigerant selected from the group consisting of R134a (1,1,2-tetrafluoroethane) and R-1234-yf (2,3,3,3-tetrafluoropropene) when tested according to SAE J2064 at 80° C.+/−2° C.

30. The hose of claim 1, comprising the following distinct layers in the hose's radial direction from the outside inwards:
  a cover layer;
  a reinforcement layer;
  the rubber backing layer;
  the polyamide layer; and
  a resistance layer.

* * * * *